United States Patent [19]

Samuels

[11] Patent Number: 5,336,732
[45] Date of Patent: Aug. 9, 1994

[54] PROCESS FOR FORMING POLYAMIDE/POLY(PHENYLENE ETHER) BLENDS

[75] Inventor: George J. Samuels, Bridgewater, N.J.

[73] Assignee: AlliedSignal Inc., Morristownship, Morris County

[21] Appl. No.: 17,663

[22] Filed: Feb. 12, 1993

[51] Int. Cl.$^5$ .................... C08L 77/00; C08L 71/02
[52] U.S. Cl. .................... 525/397; 525/391; 525/392; 525/905
[58] Field of Search .................... 525/397, 391, 392

[56] References Cited

U.S. PATENT DOCUMENTS

| | | | |
|---|---|---|---|
| 3,379,792 | 4/1968 | Fienbek | 260/857 |
| 4,315,086 | 2/1982 | Uene et al. | 525/397 |
| 4,338,421 | 7/1982 | Maruyana et al. | 525/397 |
| 4,391,950 | 7/1983 | Cooper . | |
| 4,433,088 | 2/1984 | Haaf et al. . | |
| 4,600,741 | 7/1986 | Aycock et al. . | |
| 4,654,405 | 3/1987 | Jalbert et al. | 525/391 |
| 4,659,760 | 4/1987 | van der Meer . | |
| 4,689,372 | 8/1987 | Han et al. . | |
| 4,732,937 | 3/1988 | Sybert . | |
| 4,732,938 | 3/1988 | Grant et al. . | |
| 4,745,157 | 5/1988 | Yates, III et al. . | |
| 4,746,708 | 5/1988 | Sybert . | |
| 4,751,268 | 6/1988 | Taubitz et al. . | |
| 4,839,425 | 6/1989 | Mawatari et al. . | |
| 4,873,276 | 10/1989 | Fujii et al. . | |
| 5,084,511 | 1/1992 | Abe et al. . | |
| 5,084,523 | 1/1992 | Neugebauer et al. . | |

FOREIGN PATENT DOCUMENTS

| | | |
|---|---|---|
| 0129825 | 1/1985 | European Pat. Off. . |
| 0236593 | 12/1986 | European Pat. Off. . |
| 0236598 | 12/1986 | European Pat. Off. . |
| 0250979 | 6/1987 | European Pat. Off. . |
| 0255184 | 7/1987 | European Pat. Off. . |
| 66452 | 4/1984 | Japan . |
| WO85/05372 | 12/1985 | PCT Int'l Appl. . |
| WO87/00540 | 1/1987 | PCT Int'l Appl. . |
| WO87/05311 | 9/1987 | PCT Int'l Appl. . |
| WO87/07281 | 12/1987 | PCT Int'l Appl. . |

Primary Examiner—James J. Seidleck
Assistant Examiner—Mary Critharis
Attorney, Agent, or Firm—Melanie L. Brown; Roger H. Criss

[57] ABSTRACT

A process for forming a blend comprising a poly(phenylene ether) domains dispersed in a polyamide matrix, said process comprising the steps of:

(a) forming a reaction mixture comprising a substituted or unsubstituted poly(phenylene ether), preferably one or more compatibilizers and a polyamide precursor; and (b) polymerizing said precursor to form a blend comprised polyamide matrix having poly(phenylene ether) domains dispersed therein.

15 Claims, No Drawings

PROCESS FOR FORMING POLYAMIDE/POLY(PHENYLENE ETHER) BLENDS

BACKGROUND OF THE INVENTION

1. Field of the Invention

This invention relates to polyamide/phenylene ether blends and to methods of forming such blends. Another aspect of this invention relates to polymer articles, formed totally or in part from said blends e.g., films, molded articles, tapes, housings, ribbons, rods, laminates, panels, composites and the like.

2. Description of the Prior Art

Compositions of poly(phenylene ethers) and polyamides are known. See for example, U.S. Pat. Nos. 3,379,792; 4,338,421; 4,315,086; and 4,654,405; European Patent Application 0,129,825; and International Application PCT/WO87/00540.

SUMMARY OF THE INVENTION

One aspect of this invention relates to a process of forming a blend comprising one or more polyamides and one or more poly(phenylene ethers) said process comprising the steps of:
  (a) forming a reaction mixture (preferably a solution) comprising one or more poly(phenylene ethers) and one or more polyamide precursors, preferably with an effective amount of an effective compatibilizer; and
  (b) polymerizing said polymer precursors to form a blend comprising domains of said poly(phenylene ethers) dispersed in a polyamide matrix, wherein the average diameter of said poly(phenylene ether) domains is from about 0.4 microns to about 4 microns with a maximum diameter of not more than about 6 microns, the said poly(phenylene ether) domains comprising occluded polyamide domains, preferably having an average diameter of from about 0.1 to about 0.3 microns with a maximum diameter of about 0.5 microns.

As used herein "solution" is a real solution having a concentration of at least about 0.05% by wgt of the solution; a "polyamide precursor" is a chemical species, such as a monomer or prepolymer, which can be subjected to polymerization conditions to form the polyamide forming said polymeric matrix; and "domain diameter" is the maximum diameter of a domain as viewed by a cross-section of the domain by Transmission Electron microscopy in standard particle size analysis.

Yet another aspect of this invention relates to a blend comprising one or more polyamides comprising one or more poly(phenylene ethers) domains dispersed in a matrix of said polyamides, wherein the average diameter of said poly(phenylene ether) domains is from about 0.4 micron to about 4 microns wherein the maximum poly(phenylene ether) domain diameter is not more than about 6 microns, and wherein said poly(phenylene ether) domain includes occluded polyamide domains, preferably having a diameter equal to or less than about 0.1 microns with a maximum polyamide domain diameter of not more than about 0.5 microns.

The blends of the invention exhibit improved mechanical properties as for example impact strength, tensile strength, tensile modulus, ultimate elongation, notch Izod and the like, when compared to blends made by other processes as for example melt blending processes. The blends also exhibit improved thermal properties as evidenced by improved heat sag and heat deflection temperatures (DTUL). While we do not wish to be bound by any theory, it is believed that the improved properties result from the average and maximum diameters of the poly(phenylene ether) domains in the polyamide phase and the average and maximum diameters of the occluded polyamide domains in the poly(phenylene ether) domains.

DETAILED DESCRIPTION OF THE INVENTION

The process of this invention is conveniently carried out in two essential steps. The first step of the process of this invention comprises forming a solution comprised of at least two essential ingredients. One essential ingredient is a substituted or unsubstituted poly(phenylene ether). The type of poly(phenylene ether) employed is not critical and may vary widely depending on the physical properties and features, i.e., tensile strength, modulus and the like, desired in the blend. Thus, a multiplicity of poly(phenylene ethers) having wide variations in physical properties are suitable for use in the process of this invention. Any poly(phenylene ether) can be used in the practice of this invention. Illustrative of useful poly(phenylene ethers) are those having recurring monomeric units of the formula:

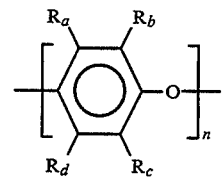

wherein: n is an integer of at least about 20 and preferably at least about 50; and $R_a$, $R_b$, $R_c$ and $R_d$ are the same or different and are groups such as hydrogen or hydrocarbon which may optionally include one or more divalent oxygen atoms such as alkyl as for example, methyl, ethyl, propyl, pentyl, octyl, neopentyl, isopropyl, sec-butyl, dodecyl and the like; alkoxy such as methoxy, propoxy, nonoxy, isopropoxy and the like; alkoxyalkyl such as methoxymethyl, ethoxymethyl, butoxymethyl, propoxyethyl, methoxylbutyl and the like; aryl such as 2,4-dimethyl phenyl, phenyl and the like; aryloxy such as phenoxy 4-methylphenoxy and the like; aryloxyalkyl and aryloxyaryl such as phenoxyphenyl, phenoxymethy, and the like; haloalkyl such as trifluoromethyl, trichloromethyl, and the like; halogen such as bromo, chloro, fluoro and the like; alkoxyaryl, alkylaryl and arylalkyl groups such as 4-methoxyphenyl, 4-methylbenzyl, 2,4dimethylphenyl, benzyl, phenethyl and the like; and cycloalkyl such as cyclohexyl, cyclopentyl, cyclooctyl, cycloheptyl and the like.

Illustrative of useful poly(phenylene ethers) are those described in U.S. Pat. Nos. 3,306,875; 4,315,086; 3,360,875; 3,337,501; and 3,787,361. Such illustrative polyphenylene ethers include poly(1,4-phenylene ether), poly(2,6-dimethyl-1,4-phenylene ether), poly(2,6-diphenyl 1,4-phenylene ether), poly(2,6-dimethyl-1,4-phenylene ether), poly(2-methyl-1,4-phenylene ether), poly(3-methyl-1,4-phenylene ether), poly(2,6-dilauryl-1,4-phenylene ether), poly(2,6-dimethoxy-1,4-phenylene ether), poly(2,6-diethoxy-1,4-phenylene ether), poly(2- methoxy-6ethoxy- 1,4-phenylene ether), poly(2,6-dibenzyl-1,4-phenylene ether), poly(2,6-diethyl-1,4-phenylene ether), poly(2,6-dipropyl-1,4-phenylene ether), poly(2,3,6-trimethyl- 1,4-phenylene ether), poly(2,3,5,6-tetramethyl-1,4-phenylene ether), poly(2,6-dichloro1,4-phenylene ether), poly(2,6-diphenyl-1,4-phenylene ether), poly(2,6-dipropyl-1,4-phenylene ether) and the like.

Preferred for use in the practice of this invention are poly(phenylene ethers) in which $R_b$ and $R_c$ are substituents other than hydrogen, preferably alkyl or phenol and more preferably linear alkyl having from 1 to about 4 carbon atoms. Illustrative of such preferred polyphenylene ethers are poly(2,6-dimethyl-1,4-phenylene ether), poly(2,6-diethyl-1,4-phenylene ether), poly(2,6-diphenyl-1,4-phenylene ether), poly(2-methyl-methyl-1,4-phenylene ether), poly(2-methyl-6-propyl-1,4-phenylene ether), poly(6-dipropyl- 1,4-phenylene ether), poly(2-ethyl-6-propyl-1,4-phenylene ether) and the like. The most preferred polyphenylene ether is poly( 2,6-dimethyl-1,4-phenylene) ether.

The molecular weight or solution viscosity or intrinsic viscosity (IV) of useful poly(phenylene ethers) may vary widely. In general, the IV of useful poly(phenylene ethers) is at least about 0.2 as measured from the extrapolation of four concentrations (0.57% maximum)) of the poly(phenylene ethers) in trichloromethane ($CHCl_3$) at 25° C. to obtain [$\pi$] in accordance with ASTM D2857. In the preferred embodiments of the invention, the IV of the poly(phenylene ethers)is from about 0.2 to about 1, and in the particularly preferred embodiments of the invention useful poly(phenylene ethers) have an intrinsic viscosity (IV) of from about 0.2 to about 0.85. In the most preferred embodiments of the invention, the intrinsic viscosity (IV) is from about 0.3 to about 0.6.

Useful poly(phenylene ethers) can be obtained from commercial sources. For example, poly(2,6-dimethyl-1,4phenylene ether) can be obtained from General Electric Inc. under the trade name Noryl ® and from Sumitomo, Ltd. under the trade name PPE ®.

Useful poly(phenylene ethers) can also be prepared by known preparative techniques. For example, useful preparative techniques include aromatic nucleophilic substitution. Illustrative of such techniques are those described in U.S. Pat. No. 4,315,086. In this method, the poly(phenylene ether) polymer is formed by oxidation-polymerization of one or more phenol compounds as for example 2,6dimethylphenol, 2,6-dipropoxyphenol, 2,6-diethoxy-phenol, 2,6-dipropyl-phenol, 2-methyl-6-phenyl phenol, 2,6-diphenylphenol, 2,6-diethylphenol, 2-methyl-6-ethyl-phenol, 2,3,6-trimethylphenol, 2,4,6-trimethylphenol and the like with oxygen or an oxygen-containing gas in the presence of an oxidation-coupling catalyst such as a catalyst comprising a cuprous salt and a tertiary amines (e.g., cuprous chloride-trimethylamine, cuprous acetate-triethylamine, cuprous chloride-pyridine), catalysts comprising cupric salt-tertiary amines and alkaline metal hydrether), catalysts comprising manganese salts and a primary amine (e.g., manganese chloride ethanolamine, manganese acetate-ethylene diamine), catalysts comprising a manganese salt and an alcoholate or phenolate (e.g., manganese chloride-sodium methyl ate, manganese-14-chloride sodium phenolate) and catalysts comprising a combination of a cobalt salt and a tertiary amine.

The amount of poly(phenylene ether) in the mixture is not critical and may vary widely. In general, the amount of poly(phenylene ether) may vary from about 5 to about 60% by weight based on the total weight of the poly(phenylene ether) and polyamide in the mixture. In the preferred embodiments of the invention, the amount poly(phenylene ether) may vary from about 30 to about 50% by weight based on the total weight of the polyamide and poly(phenylene ether) in the mixture, and in the particularly preferred embodiments of the invention the amount of each of the polyamide and poly(phenylene ether) contained in the mixture in from about 40 to about 50% by weight on the aforementioned basis As a second essential ingredient, the reaction mixture includes a polyamide precursor which can be polymerized to form a polyamide. Such precursors are preferably monomers such as amino acids and derivatives thereof as for example lactams. Illustrative of such polyamide precursors are lactams of amino acids as for example lactams of 4-aminobutyric acid, 6-aminohexanoic acid, 7-aminoheptanoic acid, 8-aminooctanoic acid, 9-aminononanoic acid, 10-aminodecanoic acid, 11-aminoundecanoic acid, 12-aminododecanoic acid and the like.

Most preferred polymer precursors are monomers, especially those which are solvents for the poly(phenylene ether). Most preferred monomers are lactams, Lactams are cyclic compounds represented by the formula shown below, which undergo ring-opening polymerization to form polyamides, (wherein n is an integer of about

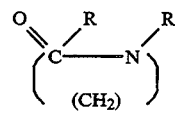

4 to about 12, and R is hydrogen or an organic radical such as aryl, alkylaryl, alkyl or an arylalkyl( each preferably having from 1 to about 8 carbon atoms), which organic radical may optionally have substituent groups) as for example, halo, alkoxy and the like. Illustrative examples include caprolactam (n=6 and R=H in above formula), caprylolactam (n=8 and R=H in the formula) and dodecanolactam (n=12 and R=H in the formula), which form upon polymerization nylon-6, nylon-8 and nylon-12, respectively.

The amount of polyamide precursor added to the reaction mixture may vary widely and will be an amount sufficient to form the desired amount of polyamide in the blend. The amount of polyamide precursor is an amount which is preferably sufficient to provide a blend where the amount of polyamide is from about 40% to about 95% by weight, more preferably from about 40 to about 70% by wt and most preferably from about 40 to about 60% by wt of the polyamide and poly(phenylene ether) in the blend.

As a third optional and preferred ingredient, the reaction mixture includes an effective amount of an "effective compatibilizer". As used herein, an "effective compatibilizer" is a material which reduces the interfacial surface tension between the dispersed poly(phenylene ether) domains and the matrix polyamide and between occluded dispersed polyamide domains and the poly(-phenylene ether) matrix for such domains thereby contributing to the development of the domain size and at the same time have sufficient interaction with the domain as well as the matrix for desirable mechanical properties.

Useful compatibilizers may vary widely and include any material which provides the desired effect. Illustrative of useful compatibilizers are random and block AB, block ABA and tapered AB copolymers; block and random ABC terpolymers; and more complex polymeric compatibilizers where the copolymer or terpolymer includes one or more portions such as blocks which are compatible with the polyamide and one or more portions such as blocks which are compatible with the poly(phenylene ether. As used herein "compatible" refers to the extent to which two or more materials have a favorable interaction which promotes the intermingling of the polyamide and the poly(phenylene ether). Compatibility derives from a number of factors including one or more of the following criteria: similar cohesive energy densities, similar or complimentary capacities for dispersive, polar, or hydrogen bonding interactions, or other specific interactions, such as acid/base or Lewis-acid/Lewis-base interactions.

The compatibiliers can be added directly to the blend or may be formed in situ by the addition of a reactive precursor resulting in a graft block copolymer and the like having one or more blocks formed from the polyamide, from the poly(phenylene ether) or a combination thereof and one or more blocks derived from the reactive precursor. Reactive precursors contain functional groups that can react with one or more of the components of the blend. These functional groups can vary widely and include carbon-carbon triple bonds, hydroxyl, carboxylic acids, esters, anhydrides, oxazolines, amines, isocyanates, blocked isocyanates, aldehydes, carbon carbon double bonds and the like. This is not an exhaustive list but is representative of the kinds of functional groups used for the in situ formation of "effective compatibilizers" that can be found in the art.

Preferred compatibilizers are maleated poly(phenylene ethers), maleated styrene or styrene maleic anhydride copolymers, styrene acrylic acid copolymers, oxazoline terminated styrene polymers and the like. More preferred compatibilizers are maleated poly(phenylene ethers), maleated styrene or styrene maleic anhydride copolymers, styrene acrylic acid copolymers. Most preferred compatibilizers are maleated poly(phenylene ethers) or styrene maleic anhydride copolymers.

An "effective amount of the compatibilizer" is used. As used herein, an "effective amount of the compatibilizer" is an amount which is sufficient to reduce the dispersed phase size to the desired size. The amount of compatibilizer is preferably from about 3 to about 50% by wt of polyamide and poly(phenylene ether) in the blend. The amount of compatibilizers is preferably from about 7 to about 30 and is more preferably from about 10 to about 20% by weight of polyamide and poly(phenylene ether) in the blend.

Various other optional ingredients, which are normally included in polymer compositions, may be added to the mixture at an appropriate time during the conduct of the process. For example, these optional ingredients can be added either prior to or after the first step of the process of this invention; or after the conduct of the second step in which the desired blend has been formed. Such optional components include fillers, plasticizers, impact modifiers, colorants, dyes and pigments, mold release agents, anti-oxidants, ultraviolet light stabilizers, lubricants, antistatic agents, fire retardants, nucleating agents, oxidative and thermal stabilizers and the like. These optional components are well known to those of skill in the art, accordingly, will not be described herein in any detail.

In the preferred embodiment of this invention an elastomeric or rubbery polymer is included in the blend because it has a positive affect on the impact resistance of the blend. The rubbery or elastomeric polymer is defined as having an ASTM D638 tensile modulus of less than about 40,000 psi (276 Ma), preferably, less than 20,000 psi (138 Ma). It can be a block or graft copolymer. Useful rubbery polymers can be made from reactive monomers which can be part of the polymer chains or branches, or grafted on to the polymer. These reactive monomers can include dienes, and carboxylic acids and derivatives thereof such as esters and anhydries. Such rubbery polymers include natural rubber, nitrile rubber, polyacrylates, butadiene polymers, isobutylene/isoprene-16 copolymer, styrenes/ethylene/propylene/diene copolymers, acrylonitrile/styrene/diene copolymers, ethylene/styrenes/diene copolymers, butadiene/styrene copolymers, styrene/butadiene/styrene copolymers, acrylonitrile/butadiene/styrene copolymers, Poly(chloroprene), acrylonitrile/butadiene copolymers, Poly(isobutylene), isobutylene/butadiene copolymers, ethylene/propylene copolymers, polyneoprene, ethylene/propylene/butadiene copolymers, and wholly or partially hydrogenerated oxidized or carboxylated derivatives. Useful rubbery polymers can include monomeric units derived from aromatic vinyl monomers, olefins, acrylic acid, methacrylic acid and their derivatives. Useful rubbery polymers and their preparation are disclosed in U.S. Pat. Nos. 4,315,086 and 4,175,358.

Preferred rubbers for use in the practice of this invention are carboxylated rubbers such as rubber resulting from the reaction of rubbers with an hydrides such as maleic anhydrides, and the like; by reaction with ozone followed by oxidation with an agent such as permanganate; and grafting of double bond unsaturated monomers having pendant carboxylic acid functions such as acrylic acid, methacrylic acid and the like. Particularly preferred rubbers are maleated rubbers, especially where the rubbers are simple tri-block copolymers of the type A-B-A, or multi block copolymers of the type $(AB)_n$, or radical configuration copolymer of the type. $R-(BA)_x$, where n is 2 to 10, x is 3 to 150 "A" is a block derived from a polyvinyl aromatic monomer such styrene or vinyl toluene, and "B" is a block derived from a conjugatated diene elastomers. Many of these elastomers are produced commercially by the Shell Chemical Co. under the trade name Kraton ®. The elastomeric material functions to improve the impact resistance of the blend.

In general, the amount of such elastomeric materials added should be sufficient to provide the desired impact resistance. The amount of elastomeric materials is usually from about 2.5 to about 25% by weight based on the total weight of polyamide and poly(phenylene ether), and is preferably from about 3 to about 18% by weight, more preferably from 5 to about 15% by weight and most preferably from about 7 to about 12% by weight on the aforementioned basis.

In the second step of the process, the polymer precursor, such as a monomer, is polymerized at a temperature, at a pressure and for a time sufficient to form the desired polymer blend. The method of polymerization of the polymer precursor will vary widely depending on the precursor of choice. Such methods are well known in the art and will not be described herein in great detail. See for example D. B. Jacobs and J. Zimmerman in High Polymers, 29, 424 (1977), Preparation of 6,6-Nylon and Related Polyamides, as well as Lactam-Based Polyamides Vol 1 and 2, by R. Puffr and V. Kubanek, published by CRC Press (1991) and the respective references.

In the preferred embodiments of the invention where the polyamide precursor is a lactam, the lactam precursor is preferably polymerized by hydrolytic polymerization procedures. Such procedures are described in greater detail in Lactam-Based Polyamides Vol 1 and 2, by R. Puffr and V. Kubanek, published by CRC Press (1991) and the references therein which are incorporated herein by reference.

Polymerization temperatures may vary widely but are usually from about 230° C. to about 320° C. Polymerization temperatures are preferably from about 230° C. to about 270° C., more preferably from about 240° C. to about 270° C. and most preferably from about 250° C. to about 270° C.

Similarly, pressures are usually not critical and can be varied widely without adversely affecting the process. Consequently, the polymerization step can be conducted at subatmospheric, atmospheric or super-atmospheric pressures. In the preferred embodiments of the invention, at least a portion of the polymerization step is carried out at elevated temperature and pressure.

The polymerization step is carried out for a time sufficient to form the desired blend. Reaction times can be varied over a wide range. Usually, reaction times will depend on a variety of factors such as the polymeric components, reaction temperatures, and other factors know to those of skill in the art to affect reaction times. In most instances, the reaction time can vary from a few hours to 24 hrs. or more. In the preferred embodiments of this invention, reaction times will vary from about 6 hours to about 24 hours and in the particularly preferred embodiments from about 8 hours to about 16 hours.

In the preferred hydrolytic polymerization procedure, the polymerization is carried out in the presence of water. In general, the amount of water is from about 0.3 to about 2.5 wt % based on the weight of the polyamide precursor in the mixture. In the preferred embodiments, the weight % of water is from about 0.3 to about 1.5 weight %, and in the particularly preferred embodiments, the weight % of water is from about 1.0 to about 1.25 weight % on the same basis.

The polymerization step is preferably carried out in the absence of air, as for example, in the presence of an inert gas, such as argon, carbon diether, nitrogen or the like. The polymerization step can be carried out in a batch wise or discontinuous fashion, as for example, carrying out the polymerization step in a sealed container. Alternatively, the process can be carried out in a continuous fashion in a single processing zone, or in a plurality of such reaction zones in series or parallel.

The amount of poly(phenylene ether) in the blend may vary widely from as little as about 5 to as high as about 60% by weight of the blend, depending on the uses of the blend. In the preferred embodiments of the invention, the amount of poly(phenylene ether) is an amount which is sufficient to provide the desired effect (i.e. dimensional stability, moisture resistance, structural reinforcement, etc.) without widely adversely affecting the physical properties of the matrix polymer. The amount of poly(phenylene ether) in the blend is generally from about 5 to about 60% by weight of the polymeric components in the blend, preferably from about 30 to about 60% by weight of the blend, more preferably from about 30 to about 50% by weight of the polyamide and poly(phenylene ether) in the blend and most preferably from about 40 to about 50% by weight of the polymeric components, typically polyamide, and poly(phenylene ether) in the blend.

The blend of this invention is such that the average diameter of poly(phenylene ether) domains is preferably from about 0.4 microns to about 4 microns with a maximum diameter of about 6 microns as determined by transmission electron microscopy (TEM). The poly(phenylene ether) domains preferably have occluded polyamide domains, as shown by transmission electron microscopy where the average diameter of the occluded polyamide domains is from about 0.1 microns to about 0.5 microns with a maximum diameter of about 0.6 microns. The average diameter of the poly(phenylene ether) domains are preferably from about 0.6 microns to about 4 microns with a maximum diameter of about 5 microns, and the average diameter of occluded polyamide domains is from about 0.4 microns to about 0.2 microns with a maximum diameter of about 0.5 microns. More preferably, the average diameter of poly(phenylene ether) domains is from about 0.6 microns to about 3 microns with a maximum diameter of about 4 microns and the average diameter of occluded polyamide domains is from about 0.3 microns to about 0.2 microns with a maximum diameter of about 0.5 microns. Most preferably, the average diameter of poly(phenylene ether) domains is from about 0.6 microns to about 2 microns with a maximum diameter of about 3 microns and the average diameter of occluded polyamide domain is from about 0.1 microns to about 0.2 microns with a maximum diameter of about 0.5 micron.

The process of this invention provides blends comprising poly(phenylene ethers) dispersed in a polyamide continuous phase that have improved mechanical properties high impact resistance and which are thermoplastic materials from which molded articles of manufacture having valuable properties can be produced by the conventional shaping processes, such as casting, injection molding and extruding. Examples of such moldings are components for technical equipment, housing panels, apparatus casing, household equipment, sports equipment, components for the electrical and electronice industries and electrical insulations, car components, and semi-finished products which can be shaped by machining. The polymer compositions according to the invention are outstandingly suitable for specific applications of all types since their spectrum of properties can be modified in the desired direction in manifold ways.

The following specific examples are presented to better illustrate the invention and are not to be construed as limitations thereon.

EXAMPLE 1

Poly(phenylene ether)("PPE")/Nylon 6

A 600 ml Parr autoclave fitted with the appropriate gas inlet and outlet tube and a thermocouple well was charged with 101.5 g PPE, 162.4 g caprolactam, and 1.0 g water. The autoclave was brought to 70° C. for 15 minutes and purged with nitrogen. The temperature was then raised to 250° 1 C. under about 10 psi(68.9 MPa) nitrogen. After 6 hours at temperature the reactor was opened and the reaction mass was dehydrated for 4 hours at 250° C. under a gentle stream of nitrogen. After cooling to about 220° C. the blend was recovered from the reactor. The sample was then pulverized and twice extracted with methanol. There was a 9% weight loss due to the extraction of residual caprolactam and caprolactam oligomers.

EXAMPLE 2
PPE-g-MA/Nylon 6

A series of experiments were carried out to determine the effect of varying amounts of maleated poly(phenylene ether) compatibilizer and the degree of maleation on blend morphology. In these experiments, a 600 ml Parr autoclave was charged with 101.5 g (PPE-gMA) copolymer prepared by the free radical grafting of maleic anhydride onto PPE having an acid number of 8 or 101.5 g PPE or 101.5 g of a mixture of PPE and PPE-g-MA, 162.4 g caprolactam, and 1.0 g water. The reaction procedure was carried out as described in Example 1. The molecular weight of the nylon 6 averaged about 34,000. The compositions are set forth in the following Table I.

molecular weight to the number average molecular average molecular weight (Mw/Mn) and degree of modification of the compatibilizer on blend morphlogy. In the experiments, a 600 ml Parr autoclave was charged with 101.5 g PPE; 162.4 g caprolactam; 11 g styrene/maleic anhydride copolymers of varying molecular weights, Mw to Mn ratios and the degrees of modification; and 1.0 g water. The autoclave was brought to 70° C. for 15 minutes and purged with nitrogen. The temperature was then raised to 250° C. under about 10 psi (68.9 MPa) of nitrogen. After 6 hours at a temperature of 25° C. the reactor was opened and the reaction mass was dehydrated for 4 hours at 270° C. under a gentle stream of nitrogen. After cooling to about 220° C. the blend was recovered from the reactor. The sample was then pulverized and twice extracted with boiling methanol removing 17 wt % caprolactam monomer and oligomers (this was noted because of the large amount of extractables). The samples were evaluated by TEM to determine the effect of compatibilizer molecular weight, and the degree of modification of the compatibilizer on blend morphology. The results are set forth in the following Table II.

TABLE II

| SAMPLE NO | Mn | Copolymer Copatibilizer Mw/Mn | MA/Mole | COPOLYMER COMPATIBILIZER 2Phase Size Range |
|---|---|---|---|---|
| 1 | 7700 | 3.50 | .75 | <1 μm to ≈ 5 μm |
| 2 | 7650 | 3.92 | 2.04 | <1 μm to ≈ 10 μm |
| 3 | 47500 | 2.09 | 1.31 | mostly <1 μm to 5 μm, some to 15 μm |
| 4 | 56200 | 2.16 | 2.86 | 1 μm to ≈ 30 μm |
| 5 | 23100 | 2.63 | 0.47 | 1 μm to ≈ 50 μm |
| 6 | 28600 | 2.23 | 2.82 | 1 μm to ≈ 40 μm |
| 7 | 28600 | 2.23 | 2.82 | mostly 1 μm to 3 μm, some to 20 μm |
| 8 | 78900 | 2.13 | 1.34 | mostly <1 μm to 10 μm, some to 50 μm |

*Identical to run 6 except stirring rate increased from 300 to 650 rpm.

TABLE I

| Sample No | PPE | CL* | PPE-MA (1.9 awt %) | PPE-MA (0.7 wt %) |
|---|---|---|---|---|
| A | 35 | 60 | 4 | 0 |
| B | 0 | 60 | 40 | 0 |
| C | 35 | 60 | 0 | 4 |
| D | 0 | 60 | 0 | 40 |

*CL = Caprolactam

Transmission Electron Microscopy (TEM) analysis of the four PPE/Nylon 6/Compatibilizer blends shown in Table I were conducted using both phosphotungstic acid (PTA) as well as RuO4 as complimentary stains. The TEM analyses of the PPE/Nylon blends addresses the effect of PPE functionalization and the effect volume percent functionalized PPE on the blend morphology. The dispersed PPE phase in sample A is about 2.5μ in size, and in sample D the dispersed phase is about 1μ in size. The PPE phase in the other samples varies from what looks like an interpenetrating network of PPE and Nylon, sample B, to large 20 μ domains of PPE in sample C. All of these samples contain occluded nylon in the dispersed PPE phase. This is not observed for "Noryl GTX 910" a nylon 6/PPE blend manufactured and sold by General Electric Company.

EXAMPLE 3
PPE/Styrene-Maleic Anhydride/Nylon 6

A series of experiments were carried out to determine the effect of varying the ratio of the weight average Sample pairs, ½ and ¾, suggest that an AB graft copolymer is better than an ABA graft copolymer for compatibilizing polymer blends. Sample 5 implies that a more functionalized copolymer, about 1 MA per polymer chain, is necessary for adequate compatibilization. Sample 1⅜ show the influence of mole percent compatibilizer. The sample with the greatest mole % compatibilizer, Sample 1, has the more dispersed PPE phase.

All the styrene compatibilized samples had fractured PPE nylon interfaces in the direction of the microtome cut. This suggests that either there was not enough copolymer present or that the copolymer molecular weight was too low. For maximum interfacial adhesion the compatibilizer blocks must be at least as long as their entanglement lengths with each of the phases. In the case of styrene, the entanglement length is a Dp≈180 or a Mn of about 20 k. Assuming a random styrene maleic anhydride copolymer only samples 3 and 6 satisfy this criteria. Since these samples had fractured interfaces too, there apparently was insufficient compatibilizer present in these samples. Based on literature models, about 15–20wt % of a linear AB styrene/nylon 6 compatibilizer with a styrene Mn≈20 k would be necessary to compatibilize this blend and at the same time provide maximum interfacial adhesion. A fraction of the PPE particles in all the blends contained occluded Nylon 6. It should be noted that no attempt has been made to optimize the concentration, molecular weight, or MA content of the styrene/maleic anhydride copolymers.

EXAMPLE 4

PPE-g-MA/Nylon 6/Styrene-Ethylene-Butadiene-Styrene(SEBS) Rubber

A 600 ml Parr autoclave was charged with 135 g PPE-gMA, 135 g caprolactam, 30 g (SEBS) ABA copolymer (Kraton 1652) and 1.2 g water. The autoclave was brought to 100° C. and held there for 15 minutes to purge the system with nitrogen. The temperature was then raised to 250° C. under about 10 psi nitrogen. After 6 hours at temperature the reactor was opened and the reaction mass was dehydrated for 4 hours at 270° C. under a gentle stream, 2 ft/hr, of nitrogen. After cooling to about 220° C. the blend was recovered from the reactor. The sample was then pulverized and twice extracted with boiling methanol removing caprolactam monomer and oligomers.

EXAMPLE 5

PPE-g-MA/Nylon 6/Ethylene-Propylene-g-MA Rubber(EP-g-MA)

A 150 ml Parr autoclave was charged with 50 g PPE-g-MA, 45 g caprolactam, 10 g EP-MA copolymer (Exxcelor 1803) and 0.55 g water. The autoclave was brought to 70° C. for 15 minutes and purged with nitrogen. The temperature was then raised to 250° C. under about 10 psi nitrogen. After 6 hours at temperature the reactor was open and the reaction mass was dehydrated for 4 hours at 270° C. under a gentle stream of nitrogen. After cooling to about 220° C. the blend was recovered from the reactor. The sample was then pulverized and twice extracted with boiling water removing caprolactam monomer and oligomers.

EXAMPLE 6

Nylon 8/PPE

Five grams of caproyl lactam (2-azanonanone) and 4 grams of PPE and 0.05 g water were sealed in a polymerization ampoule and then brought to 250° C. and held there for 4 hours, the ampoule was opened and dehydrated under a nitrogen stream for 2.5 hours at 270° C. The resulting blend was isolated by breaking the ampoule. The sample was broken up further after treating with liquid nitrogen and then it was extracted with water to remove monomer and oligomers.

EXAMPLE 7

Nylon 12/PPE/Styrene-MA Copolymer

A 600 ml Parr autoclave was charged with 88 g PPE, 125 g 2-azaatridecanone(lauryl lactam), 37.5 g Styrene/Maleic Anhydride copolymer and 25 g water. The autoclave was brought to 100° C. and held there for 15 minutes to purge the system with nitrogen. The temperature was then raised to 320° C. under about 10 psi nitrogen (the autoclave pressure was erratic with a maximum of 595 psi recorded) and held there for 40 minutes. The reactor was cooled to 250° C. and then carefully opened and dehydrated for 4 hours at 250° C. under a gentle stream of nitrogen. After cooling to about 220° C. the blend was recovered from the reactor. The sample was then pulverized and twice extracted with boiling methanol. The sample lost 3.7 weight %.

COMPARATIVE EXAMPLE 1

Polyethersulfone (PES)/Nylon 6 Blends

A 600 ml autoclave was charged with 120 g PES, 200 g caprolactam, and 2.5 g water. The autoclave was brought to 70° C. and purged with nitrogen. The temperature was then raised to 250° C. under about 10 psi nitrogen. After 6 hours at temperature the reaction mass was dehydrated for 4 hours at 250° C. under a gentle stream of nitrogen. 17.3 g was lost from the reactor and 1.5 grams water was traped. It is assumed that the remaining 15.8 g was caprolactam monomer. 302.6 gram of material was recovered. The sample was then pulverized and twice extracted with boiling water, 249.3 grams of material was recovered after drying in a vacuum oven representing a 17.6 wt % loss. This material was brittle. The final blend composition was 48:52 PES:Nylon 6 by weight. Since PES has a specific gravity of about 1.24 vs about 1.14 for nylon resulting in a blend that is almost 1:1 in volume.

Optical microscopic examination of a pressed film of the blend under polarized light shows two phases with different degrees of crystallinity. ESCA sulfur mapping and beta back scatter imaging of the visibly different domains of this blend indicated no difference in sulfur content.

With DSC analysis of the resulting blend the initial heat up shows several small transitions at about 150° C. followed by a broad melt endotherm at about 204° C. After quench cooling there is a Tg at about 55° C. followed by a Nylon 6 crystallization peak at about 127° C. Quenched nylon 6 displays a crystallization exotherm at about 70° C. There has been a substantial increase in the crystallization temperature of Nylon 6. This would indicate either substantial interaction of the Nylon 6 with the PES or steric interference to recrystallization. After annealing the sample at 190° C. there was a small melting transition at 212° C. After a 16 hour anneal at 170° C. there was a broad melting endotherm at 198° C. The melting point of the Nylon 6 has also been substantially depressed from 223° C.

The molecular weight of the Nylon 6 has been determined by GPC after extraction from the blend with trifluoro ethanol. The Mn distribution is bimodal and approximately equal in area with the first peak at a $Mn \approx 990$ and the second at a $Mn \approx 1990$. These weights are very low. Nylon 6 prepared under identical conditions had FAVs of 78 and 81 which convert to Mn's of about 28,000 and 29,500 respectively. The low molecular weight for the Nylon 6 is supported by the observation that the material flowed through a capillary rheometer at 220° C. as soon as the plunger was put in place.

COMPARATIVE EXAMPLE 2

Polyether imide(PEI)/Nylon 6 Blends

A 42 wt % PEI/nylon 6 blend was been prepared using the autoclave route described above in Comparative Example 1. After dehydration the reaction mass had lost 19 grams. After water extraction, wt loss was 15 grams or 8.3%, the material was a clear dark straw brown and very brittle. Pressed films cracked like thick potato chips. The molecular weight of the nylon has not been determined. DSC analysis shows that on heat up there was a distinct melting endotherm at 165° C., on cooling there is no evidence of recrystallization but a Tg appears at about 78° C. On reheat, which appears to be a mirror image of the cooling cure, a Tg transition is observed at about 68° C.

The apparent amorphous nature of this blend could is due to amine exchange, e-amino caproic acid for m-phenylene diamine, during the caprolactam hydrolysis resulting in a completely random copolymer. A new band was present at 1400 cm$^{-1}$ and there was a 5 cm$^{-1}$ shift to lower energy in the positions of the imide bands. The band at 1400 cm$^{-1}$ is indicative of an aryl amide. This indicates that some hydrolysis has taken place in the PEI resulting in random block copolymers. No effort has been made to quantify the extent of hydrolysis.

What is claimed is:

1. A process for forming a blend comprising a poly(phenylene ether) domains dispersed in a polyamide matrix, said process comprising the steps of:
   (a) forming a reaction mixture comprising a substituted or unsubstituted poly(phenylene ether) and a polyamide; and
   (b) polymerizing said precursor to form a blend comprising a polyamide matrix having poly(phenylene ether) domains dispersed therein, wherein the average diameter of said poly(phenylene ether) domains is from about 0.4 to about 4 microns with a maximum diameter of not more than about 6 microns and wherein said poly(phenylene ether) domains include occluded polyamide domains.

2. The process of claim 1 wherein said polyamide precursor is a lactam.

3. The process of claim 2 wherein said lactam is selected from the group consisting of caproyl lactam, lauryl lactam and caprolactam.

4. The process of claim 3 wherein said lactam is caprolactam.

5. The process of claim 1 wherein said reaction mixture further comprises a compatibilizer.

6. The process of claim 1 wherein said poly(phenylene ether) is selected from the group consisting of those having recurring units of the formula:

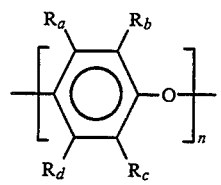

wherein:
n is an integer equal to or greater than about 20; and
$R_a$, $R_b$, $R_c$ and $R_d$ are the same or different and are hydrogen, alkyl, alkoxy, phenoxy, phenyl or halo.

7. The process of claim 6 wherein:
$R_a$ and $R_d$ are hydrogen;
n is equal to or greater than about 50; and
$R_b$ and $R_c$ are the same or different and are alkyl, phenyl or hydrogen, with the proviso that at least one of $R_b$ and $R_c$ is other than hydrogen.

8. The process of claim 7 wherein $R_b$ and $R_c$ are alkyl.

9. The process of claim 8 wherein $R_b$ and $R_c$ are the alkyl having from 1 to about 4 carbon atoms.

10. The process of claim 4 wherein $R_b$ and $R_c$ are methyl.

11. The process of claim 1 wherein the amount of poly(phenylene ether) contained in said blend is from about 5 to about 30% by weight of polyamide and poly(phenylene ether) in the blend.

12. A process of claim 1 wherein said occluded polyamide domains have an average diameter from about 0.1 microns to about 0.5 microns with a maximum domain diameter of about 0.6 microns.

13. The process of claim 12 wherein the average diameter of said poly(phenylene ether) domains is preferably from about 0.6 microns to about 4 microns with a maximum diameter of about 5 microns, and the average diameter of said occluded polyamide domains is from about 0.4 microns to about 0.2 microns with a maximum diameter of about 0.5 microns.

14. The process of claim 13 wherein the average diameter of said poly(phenylene ether) domains is from about 0.6 microns to about 3 microns with a maximum diameter of about 4 micron and the average diameter of said occluded polyamide domains is from about 0.3 microns to about 0.2 microns with a maximum diameter of about 5 microns.

15. The process of claim 14 wherein the average diameter of said poly(phenylene ether) domains is from about 0.6 microns to about 2 microns with a maximum diameter of about 3 microns and the average diameter of said occluded polyamide domain is from about 0.1 microns to about 0.2 microns with a maximum diameter of about 0.5 micron.

* * * * *